United States Patent
Mitra et al.

(10) Patent No.: US 9,195,789 B2
(45) Date of Patent: Nov. 24, 2015

(54) INCREMENTAL FUNCTIONAL VERIFICATION OF A CIRCUIT DESIGN

(71) Applicant: Synopsys, Inc., Mountain View, CA (US)

(72) Inventors: Raj Shekher Mitra, Bangalore (IN); Amit Sharma, Bangalore (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/324,004

(22) Filed: Jul. 3, 2014

(65) Prior Publication Data

US 2015/0294054 A1    Oct. 15, 2015

(30) Foreign Application Priority Data

Apr. 11, 2014   (IN) .......................... 1902/CHE/2014

(51) Int. Cl.
*G06F 17/50*    (2006.01)

(52) U.S. Cl.
CPC .................................. *G06F 17/5045* (2013.01)

(58) Field of Classification Search
CPC ............ G06F 17/5009; G06F 17/5022; G06F 17/5077
USPC ............... 703/13–15; 716/100–104, 106–107
See application file for complete search history.

(56) References Cited

U.S. PATENT DOCUMENTS

| | | | |
|---|---|---|---|
| 6,226,776 B1* | 5/2001 | Panchul et al. | 716/102 |
| 2003/0225561 A1* | 12/2003 | Garcia et al. | 703/17 |
| 2005/0198606 A1* | 9/2005 | Gupta et al. | 716/18 |
| 2006/0200788 A1* | 9/2006 | Nation et al. | 716/18 |
| 2009/0144690 A1* | 6/2009 | Spackman et al. | 716/18 |
| 2011/0041106 A1* | 2/2011 | Li et al. | 716/106 |

OTHER PUBLICATIONS

Mehta, Ashok B. et al., "Stepwise Refinement and Reuse: The Key to ESL", DVCON-2012, 2012, 5 pages, May be Retrieved at URL:<http://2012.dvcon.org/files/files/110720_Reg_Paper_Sample_2.pdf>.

* cited by examiner

*Primary Examiner* — Paul Dinh
(74) *Attorney, Agent, or Firm* — Fenwick & West LLP (57) ABSTRACT

A system and a method are disclosed for verifying the implementation of a computer chip design. A design including one or more interpretive computer programing language modules and one or more hardware description language (HDL) modules is received. When one of the interpretive programing language modules requests to communicate with one of the HDL modules, the HDL module is enabled and the input arguments from the interpretive programing language module are pipelined into the HDL module. Pipelined output data is received from the HDL module. The received output data is formatted and returned to the interpretive programing language module.

19 Claims, 9 Drawing Sheets

```
module xtor_swap(input clk);                                    ⎫ 830 swap swap_0(gclk, num1, num2, onum1, onum2);                ⎫
    assign gclk = clk & clk_gate;                               ⎭ 835
    ...
    export "DPI-C" task do_swap;                                ⎫ 840 task do_swap(input  bit[3:0] buf,
                 output bit[3:0] buf2);
        clk_gate = 1;                                           ⎫ 850 num1 = buf[0]; num2 = buf[1];
        @(posedge gclk);

for(int i=2; i<SIZE; i+=2) begin
            num1 = buf[i]; num2 = buf[i+1];
            buf2[i-2] = onum1; buf2[i-1] = onum2;
            @(posedge gclk);
        end buf2[SIZE-2] = onum1; buf2[SIZE-1] = onum2;             ⎫ 860 clk_gate = 0;                                           ⎫ 870
    endtask
endmodule
```

810

```
module swap(input clk, input num1,
                       input num2,
                       output onum1
                       output onum2);

always@(posedge clk) begin
        onum1 <= num2;
        onum2 <= num1;
    end
endmodule
```

```
typedef unsigned int U4;

extern void do_swap(svOpenArrayHandle, svOpenArrayHandle);

void swap(U4 numBuf[]) {
    U4 numBuf2[MAXNUM];

svOpenArrayHandle array1 = (svOpenArrayHandle *) numBuf;
    svOpenArrayHandle array2 = (svOpenArrayHandle *) numBuf2;

do_swap(array1, array2);

for(int i=0; i<MAXNUM; i++)
        numBuf[i] = numBuf2[i];
}
```

FIG. 9

INCREMENTAL FUNCTIONAL VERIFICATION OF A CIRCUIT DESIGN

CROSS REFERENCE TO RELATED APPLICATION

This application claims the benefit of priority under 35 U.S.C. §119 (a) to Indian Provisional Patent Application No. 1902/CHE/2014 filed Apr. 11, 2014, which is incorporated by reference herein in its entirety.

BACKGROUND

1. Field of Art

This disclosure generally relates to the field of electronic design automation (EDA), and more specifically to functional verification of a design.

2. Description of the Related Art

Verification of an electronic circuit design is oftentimes a tedious and time consuming process. As designs get more complex, the likeliness of introducing bugs into a design increases.

Some designs are first implemented using a system-level modeling language written on an interpretive programming language, such as C language or C++ language. After the desired functionality is obtained, the design is implemented in Register Transfer Level using a hardware description language (HDL) such as Verilog or Very High Speed Integrated Circuit (VHSIC) Hardware Description Language (VHDL).

The RTL implementation of the design is verified to determine if the design performs the desired functionality. For instance, the RTL implementation may be simulated and the simulation results may be compared to the behavior of the C implementation of the design. If the simulation results of the RTL implementation do not match the simulation results of the C implementation, then the RTL implementation is modified.

As designs get more complex, the likeliness of introducing an error or bug into the RTL implementation increases. As such, when verifying the RTL implementation against the C implementation, the likeliness of finding a mismatch also increases. Furthermore, as the complexity of a design increases, the difficulty in finding the cause of the error and the difficulty in fixing the error increases.

Thus, there is a need for an incremental verification framework of a circuit design to reduce the complexity of finding and fixing errors of an RTL implementation of the design.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

Configuration Overview

Embodiments of the present disclosure relate to incrementally verifying the implementation of a computer chip design. By incrementally verifying the implementation, the verification of the complete implementation is less likely to contain errors or bugs at the final stages of the design. Furthermore, during the incremental verification, the time and complexity in finding and fixing errors or bugs introduced to the implementation of the design is greatly reduced.

A verification of an implementation of a design may, for example, be the verification of an RTL implementation of a design. The verification may include comparing the simulation results of the RTL implementation against a golden result. For instance, the golden result may be the simulation results of the design implemented using the C language (C implementation).

Incremental verification of the implementation may for example include the verification of a partial implementation of the design or the implementation of a sub-set of modules of the design.

Computing Machine Architecture

Figure 1:
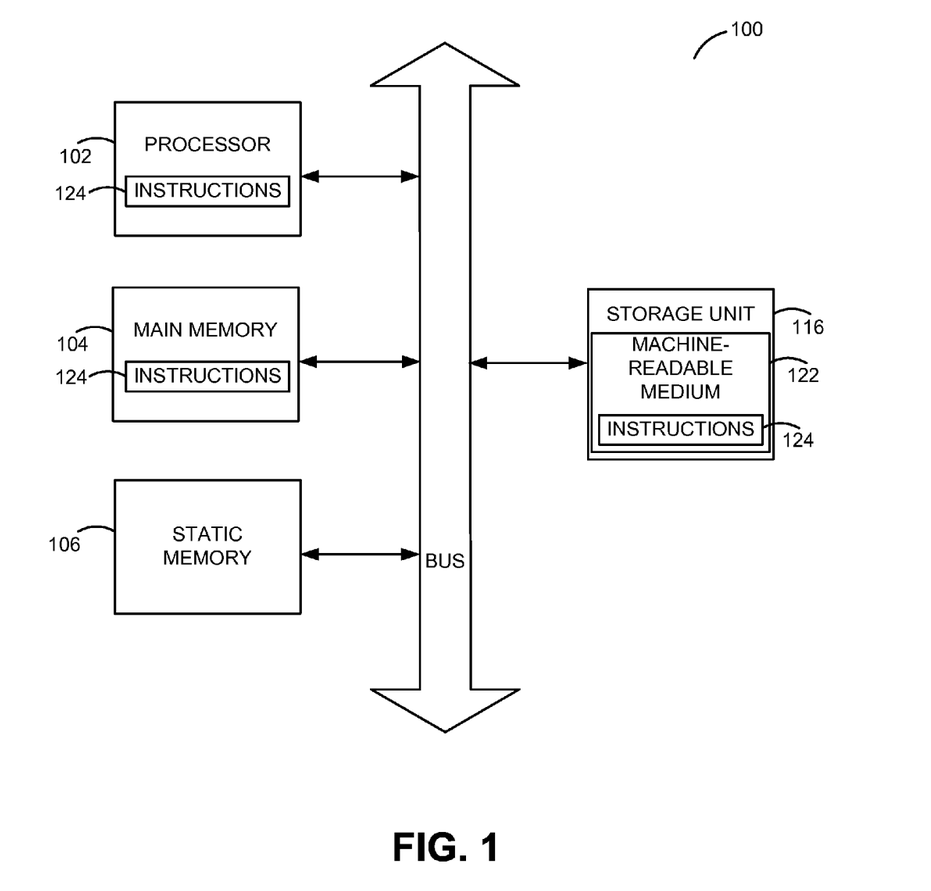
FIG. 1 illustrates a computer system for executing an electronic design automation (EDA) processes, according to one embodiment.

FIG. 1 is a block diagram of a computer system 100 for executing electronic design automation (EDA) processes, according to one embodiment. Specifically, FIG. 1 shows a diagrammatic representation of a machine in the example form of a computer system 100 within which instructions 124 (e.g., software) for causing the machine to perform any one or more of the EDA processes discussed herein may be executed. The computer system 100 operates as a standalone device or may be connected (e.g., networked) to other machines. In a networked deployment, the computer system 100 may operate in the capacity of a server machine or a client machine in a server-client network environment, or as a peer machine in a peer-to-peer (or distributed) network environment.

The example computer system 100 includes one or more processors (generally, processor 102) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, a static memory 106, and a storage unit 116 which are configured to communicate with each other via a bus 108. The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Overview of EDA Design Flow

Figure 2:
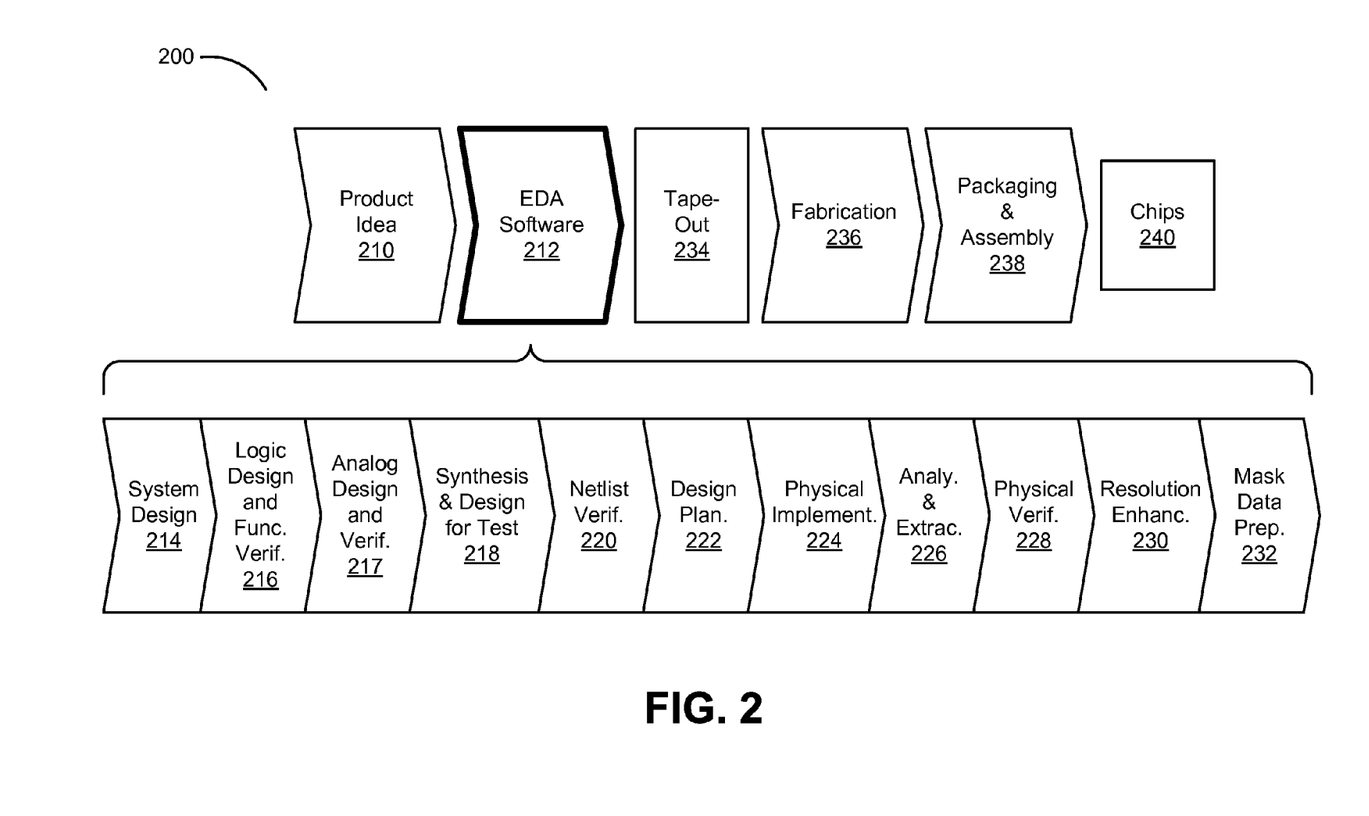
FIG. 2 is a flowchart illustrating various operations in the design and fabrication of an integrated circuit, according to one embodiment.

FIG. 2 is a flowchart 200 illustrating the various operations in the design and fabrication of an integrated circuit. This process starts with the generation of a product idea 210, which is realized during a design process that uses electronic design automation (EDA) software 212. When the design is finalized, it can be taped-out 234. After tape-out, a semiconductor die is fabricated 236 to form the various objects (e.g., gates, metal layers, vias) in the integrated circuit design. Packaging and assembly processes 238 are performed, which result in finished chips 240.

The EDA software 212 may be implemented in one or more computing devices such as the computer 100 of FIG. 1. For example, the EDA software 212 is stored as instructions 124 in the machine-readable medium 122 which are executed by the processor 102 for performing operations 214-232 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 214, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 216, hardware description language, e.g., VHDL, RTL, or Verilog code, for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During analog design, layout, and simulation 217, analog circuits are designed, laid out, and simulated to ensure both functionality and performance. Example EDA software products from Synopsys, Inc. of Mountain View, Calif. that can be used at this stage include: Custom Designer®, Hspice®, HspiceRF®, XA®, Nanosim®, HSim®, and Finesim® products.

During synthesis and design for test 218, the hardware description language is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 220, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 222, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 224, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 226, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 228, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 230, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 232, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, embodiments may be used for the processes of design planning 222 and physical implementation 224.

Overview of Design Verification Process

Figure 3:
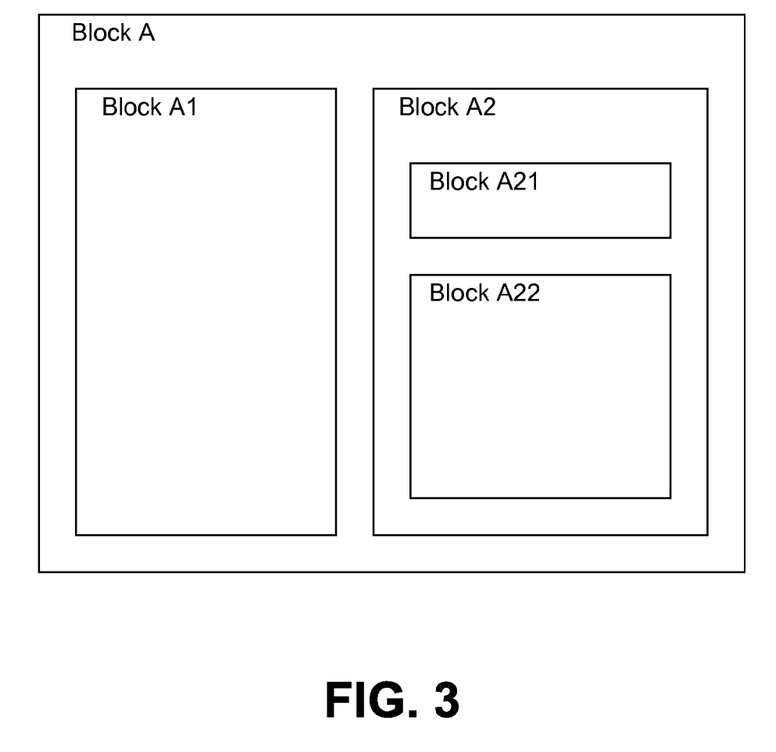
FIG. 3 is a block diagram for a design of an electronic circuit, according to one embodiment.

FIG. 3 illustrates a block diagram for a design of an electronic circuit. The design of the electronic circuit may contain blocks or modules and sub-blocks or sub-modules. For instance the design depicted in FIG. 3 includes two blocks, block A1 and block A2. Each block may then include sub-blocks. For instance, block A2 includes block A21 and block A22. In some embodiments, a design may include more blocks and sub-blocks than what is depicted in FIG. 3. For instance, a design may include tens or hundreds of blocks and sub-blocks.

For example, the electronic circuit may be a system on chip (SoC). The SoC may include a memory block and a processor block. Additionally, the processor block may include an arithmetic logic unit (ALU) block and a register bank block. The ALU may even be further divided into sub-blocks. For instance, the ALU may include and adder, a multiplier, and a shift register.

Each block may perform a specific functionality and may include one or more inputs and one or more outputs. In some embodiments, a block may be directly connected to another block. In other embodiments, a block may communicate with other blocks via a bus. In yet other embodiments, a block may be directly connected to one or more blocks and may communicate with other blocks via a bus.

Figure 4:
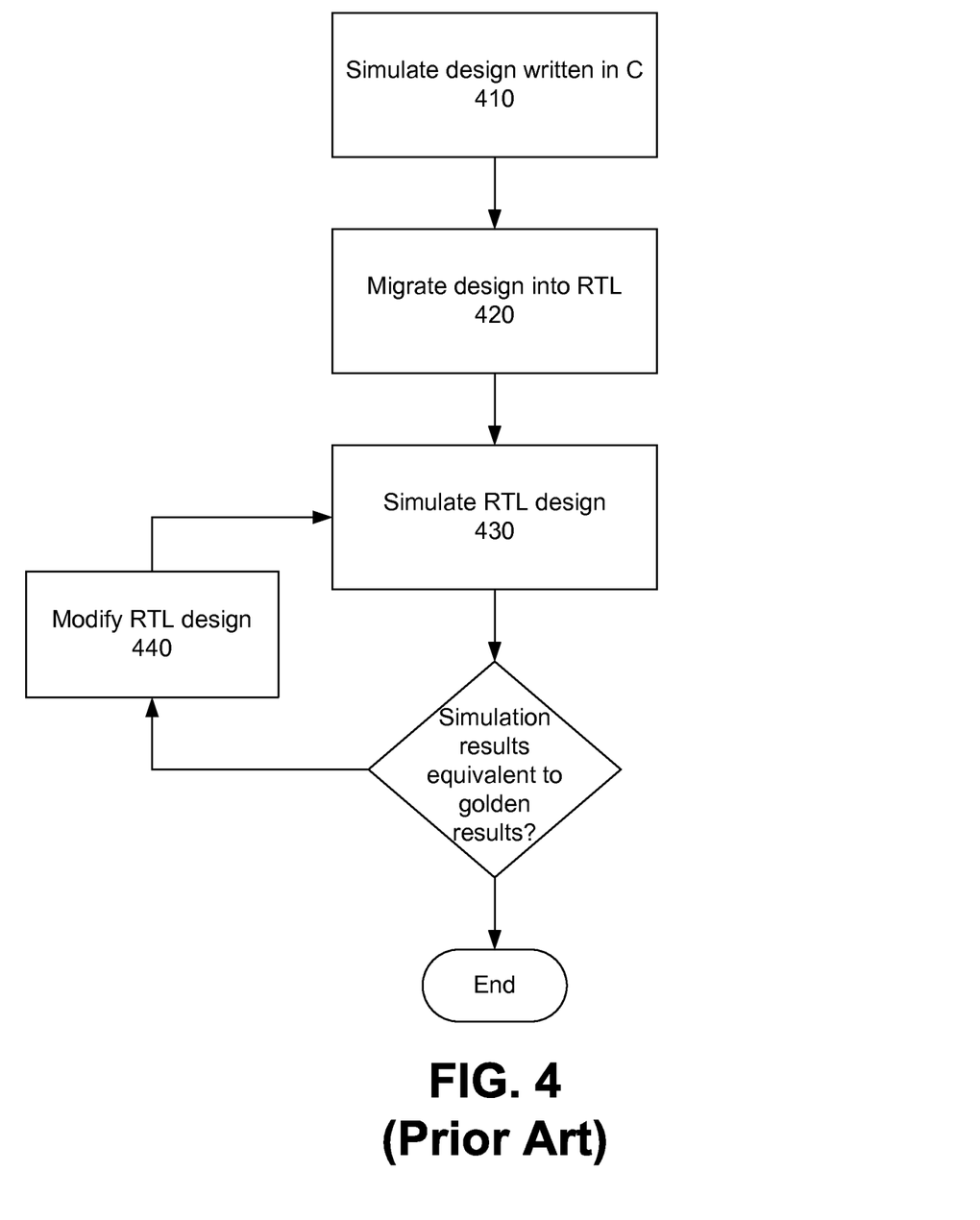
FIG. 4 is a flow diagram for verifying the design of an electronic circuit.

FIG. 4 illustrates a flow diagram for verifying the design of an electronic circuit. The electronic circuit is designed using a system-level modeling language. For instance, the electronic circuit may be designed using an interpretive programing language, e.g., C language or SystemC language. This design (e.g., C design) models the behavior of the electronic circuit. For instance, the C design of a half adder may specify that the half adder has two inputs and two outputs. Additionally, the C design may specify that the first output (Sum) is the sum of the first input and the second input, and the second output (Carry) is the carry from the sum operation of the first input and the second input.

The C design is simulated 410 to determine its behavior. Once a design with a desired functionality is obtained, the C design is migrated 420 into a RTL design using a hardware description language. The RTL design describes a hardware module that can perform the function described by the C design. For example, the RTL design of a half adder may specify that the half adder has two inputs and two outputs. The RTL design may also specify one or more registers as well as logic operations to be performed on signals received through the input ports to generate the desired output signals. For instance, the RTL design may specify that the first output (Sum) is the XOR operation between the first input and the second input, and the second output (Carry) is the AND operation between the first input and the second input. The RTL design is simulated 430 and the results are compared to the simulation results of the C design. If the simulation results of the RTL design do not match the simulation results of the C design, the RTL design is modified and/or debugged 440. After the RTL design has been modified and/or debugged, the RTL design is simulated 430 once more and compared to the C design. This process may be repeated until the simulation results of the RTL design match the simulation results of the C design.

When the simulation results of the RTL design and the simulation results of the C design match, the verification process is complete. After this, other tools, such as logic-synthesis tools may be used with the verified RTL design, as shown in FIG. 2.

In some embodiments, the output of the verification tool used to verify the design of the electronic circuit is a binary output. The verification tool may generate an output that indicates whether the behavior of the RTL design matches the behavior of the C design. In other embodiments, the verification tool may generate one or more output files. For instance, the verification tool may generate a file to help debugging the RTL design if mismatches in the behavior of the RTL design and the C design are found. The file may, for example, contain the value of signals at certain nodes in the RTL design.

In some embodiments, an RTL module may be emulated instead of simulated. For instance, during emulation, the RTL design may be implemented into multiple field programmable gate arrays (FPGA). For some complex designs, the simulation of the RTL module may take a long time to execute. In those instances, emulating the RTL module may expedite the obtainment of the output of the RTL module.

Figure 5:
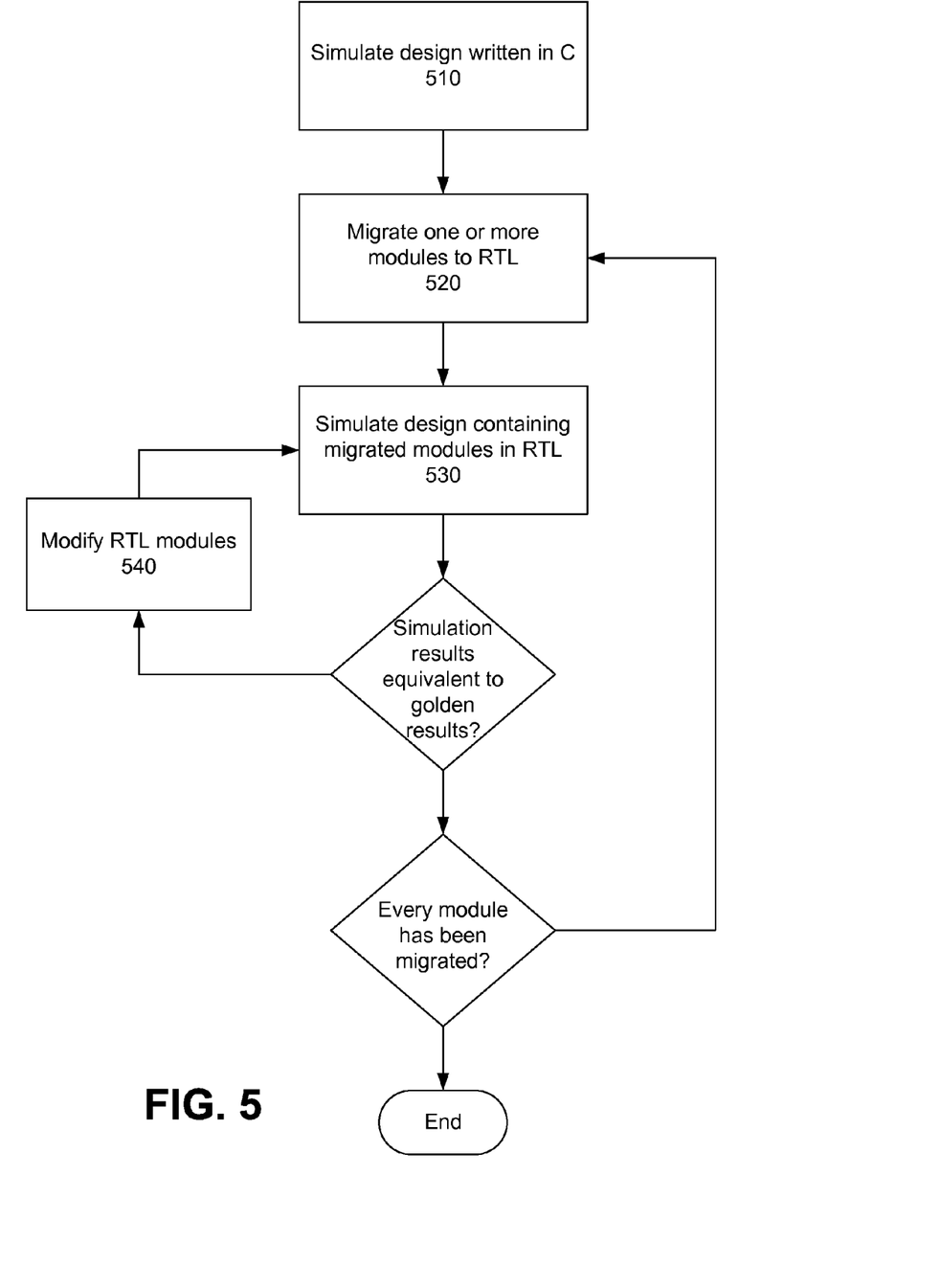
FIG. 5 is a flow diagram for incrementally verifying the design of an electronic circuit, according to one embodiment.

FIG. 5 illustrates a flow diagram for incrementally verifying the design of an electronic circuit, according to one embodiment. The electronic circuit is designed using a system-level modeling language. For instance, the design is designed using an interpretive programing language such as C language to generate a C design. The C design is simulated 510 to determine its behavior. Once a design with the desired functionality is obtained, an incremental migration of the blocks or modules from the C design into an RTL design is performed.

After the desired behavior is obtained with the C design, a subset of modules from the C design is translated 520 into RTL. Once the subset of modules has been translated, a mixed design containing the subset of modules translated into RTL and a subset of modules in C is simulated 530. The simulation results of the mixed design are compared to the simulation results of the C design. If the simulation results of the mixed design do not match the simulation results of the C design, the recently translated modules are modified 540 and the mixed design is simulated 530 one more time. This process is repeated until the simulation results of the mixed design matches the simulation results of the C design.

Once the behavior of the mixed design matches the behavior of the C design, a second subset of modules is translated from the C design into RTL. A mixed design including the first subset and the second subset of modules translated into RTL is simulated 530 and compared with the C design. This process is repeated until all the modules of the C design are translated into RTL.

With this approach, RTL modules can be tested earlier in the design process. Additionally, when the entire design has been migrated into RTL, the RTL design would be less likely to contain accumulated bugs or errors as they would be identified and addressed earlier in the design process. Thus, the disclosed process reduces the amount of time to migrate a design from C into RTL and helps finding errors in the RTL design earlier in the design cycle.

RTL modules are timed, while C modules are not timed. As a result, RTL modules and C modules are not easily integrated. Thus, communication between a C module and an RTL module may not be easily implemented. For instance, an RTL module may receive certain inputs at pre-defined clock cycles. For example, an RTL module may receive an array of 32 elements, one element per clock cycle during 32 clock cycles. A module that translates the untimed data into timed data may be used to enable the communication between a C module and an RTL module. In order to simulate a mixed design containing both RTL modules and C modules, transactors can be used.

Transactors are modules that change the level of abstraction of data that flows though the transactor. For instance, a transactor may be an RTL module that receives data from a C module and pipelines the data to be inputted to another RTL module. For example, in a mixed design, a C module may transfer data back and forth with an RTL module. The C module may output an array of data. A transactor may receive the array of data and input the array of data one element per clock cycle into the RTL module. Conversely, a transactor may receive pipelined data from an RTL module and structure the data (e.g., structures the data into an array) in order to be readable by a C module.

In some embodiments, the transactors are generated prior to simulating a mixed design. The transactor may be generated based on the RTL modules that are included in the mixed design. In one embodiment, one transactor is generated for each RTL module. In other embodiments, only one transactor is generated for all the modules in the mixed design.

Figure 6:
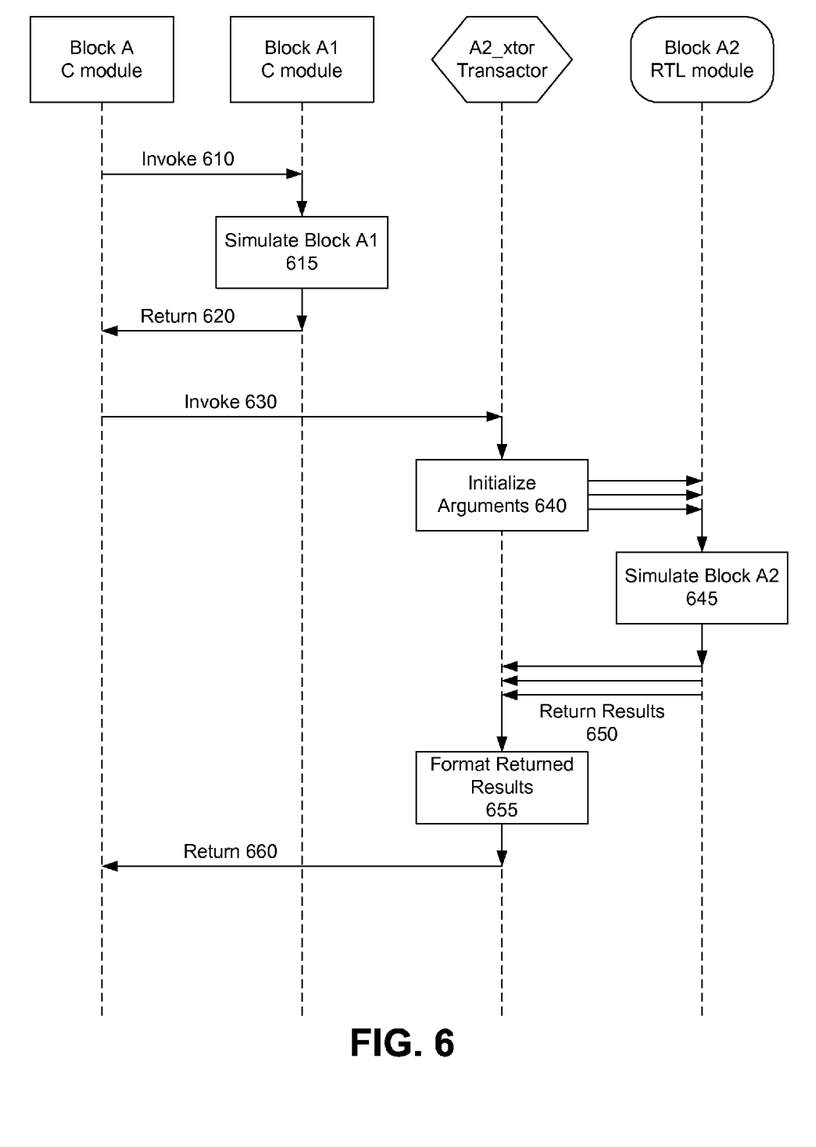
FIG. 6 is a flow diagram of the simulation of a mixed design, according to one embodiment.

FIG. 6 illustrates a flow diagram of the simulation of a mixed design, according to one embodiment. Block A may include multiple sub-blocks. For instance, block A may include block A1 and block A2. In the example of FIG. 6, block A1 is a C module and block A2 is an RTL module. Both block A1 and block A2 communicate with block A. Since block A1 and block A are both C modules, the communication between block A1 and block A can easily be implemented. On the other hand, since block A2 is an RTL module and block A is a C module, the communication between block A2 and block A1 is not easily implemented. Thus, to handle the communication between block A2 and block A, a transactor A2_xtor is implemented.

When block A communicates with block A1, block A may simply invoke 610 block A1 and pass the arguments to block A1 directly. Similarly, when block A1 finishes simulating 615, block A1 may return 620 the results of the simulation directly to block A.

Alternatively, when block A communicates with block A2, the communication is performed through the transactor A2_xtor. Block A may invoke 630 block A2 as if block A2 were a C module. The arguments are passed to the transactor A2_xtor and the transactor A2_xtor initializes 640 the arguments into block A2. For instance, transactor A2_xtor may input one argument per clock cycle into block A2. Similarly, when block A2 finishes simulating 645, block A2 may return 650 the results of the simulation as if block A were an RTL module and the transactor A2_xtor formats 655 the output of block A2 into a format that can be read by block A. For instance, block A2 may output pipelined data. Transactor A2_xtor may collect the pipelined data and format the data into an array that can be returned 660 back to block A.

Figure 7:
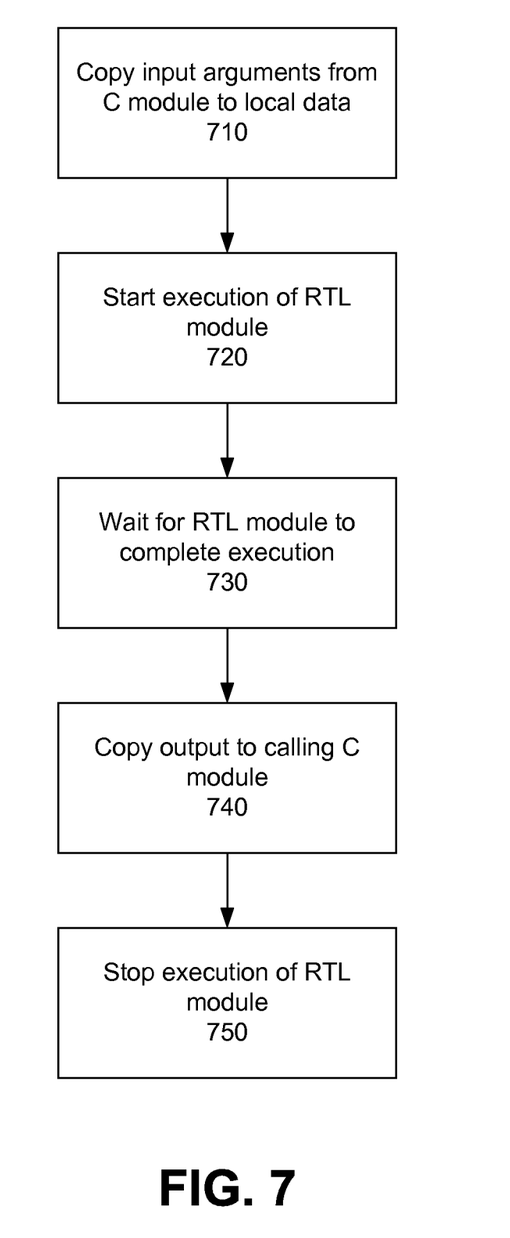
FIG. 7 is a flow diagram for the operation of a transactor, according to one embodiment.

FIG. 7 illustrates a flow diagram for the operation of a transactor, according to one embodiment. The transactor copies 710 the input arguments provided by a C module to the RTL module. The transactor starts 720 the execution of the RTL module. In some embodiments, to start the execution of the RTL module, the transactor may enable a clock signal of the RTL module.

The transactor waits 730 for the execution of the RTL module to be complete. In some embodiments, the transactor determines the number of clock cycles that the RTL module uses to execute.

The transactor copies 740 the output of the RTL module into the calling C module. The transactor may, for example, receive multiple output elements at different clock cycles and generates an array containing all the output elements. The transactor stops 750 the execution of the RTL module. In some embodiments, to stop the execution of the RTL module, the transactor may disable the previously enabled clock signal. By stopping the execution of the RTL module, the simulation of the mixed design can be sped up since computational resources are not used while the RTL module is not in use.

Figure 8:
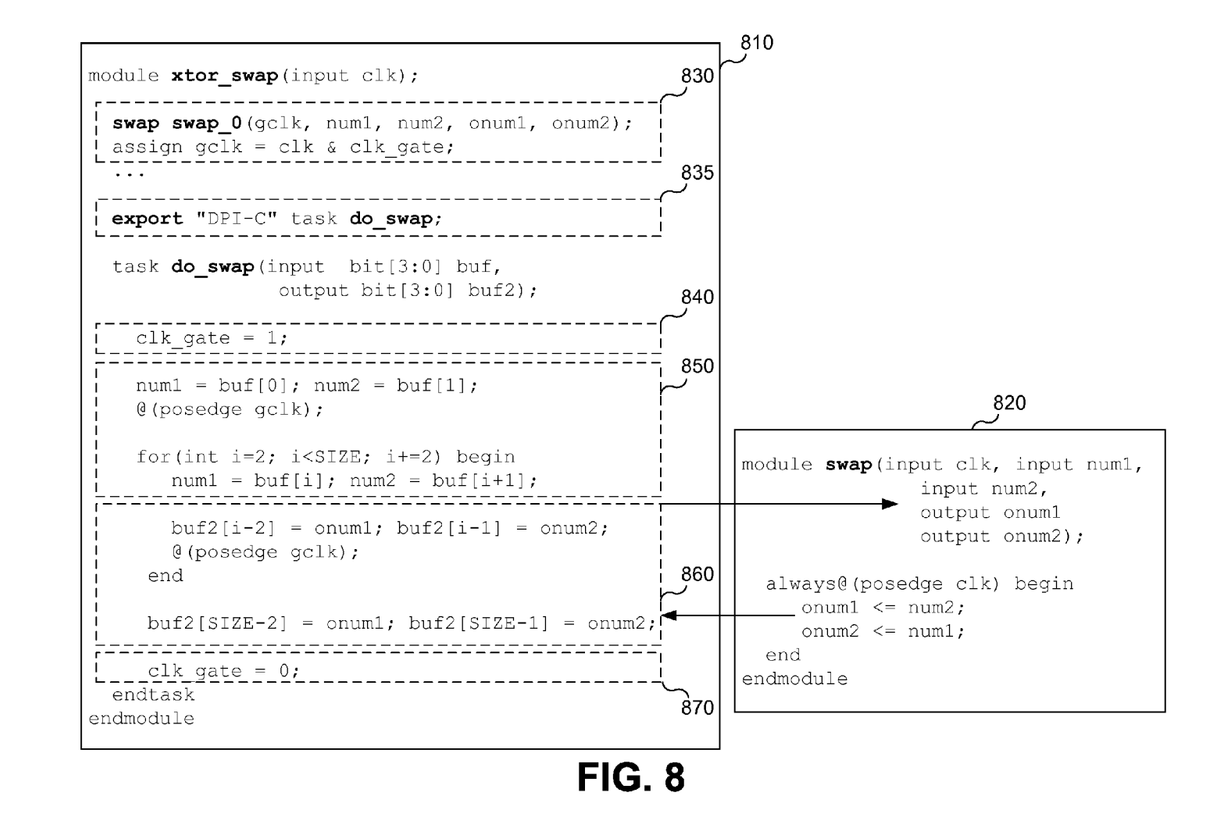
FIG. 8 is an exemplary code for a RTL module and a transactor.

FIG. 8 illustrates an exemplary code for a RTL module 820 and a transactor 810. In this example, the RTL module 820 is configured to swap two numbers. The RTL module has one clock input clk, two data inputs num1 and num2, and two data outputs onum1 and onum2. The transactor 810 is configured to enable the communication between the RTL module 820 and a C module (not shown).

Transactor 810, at code 830, instantiates the RTL module "swap." At code 835, transactor 810 indicates that the RTL task "do_swap" may be called from a C module. At code 840, transactor 810 enables the clock of the RTL module to start the execution of the RTL module. In this example, the transactor enables the clock gclk of the RTL module by setting the value of clk_gate to 1.

Transactor 810, at code 850, copies input values from the C module into the RTL module 820, in a pipelined manner. Since the RTL module 820 has two inputs, the transactor inputs two numbers into the RTL module per clock cycle. As such, during the first clock cycle, the transactor inputs buf[0] into the first input of the RTL module 820 and inputs buf[1] into the second input of the RTL module 820. The pipelined process is repeated at each clock cycle until all the input numbers have been inputted to the RTL module 820.

Transactor 810, at code 860, receives the data from the RTL module 820 and stores the received data into an array buf2 to be returned to the C module, in a pipelined manner. During each clock cycle of the pipeline, the transactor receives the output values from onum1 and onum2 and stores them into buf2[$i-2$] and buf2[$i-1$] respectively. After the last clock cycle, when the last two output values are received from RTL module 820, transactor 810 stores the received output values from onum1 and onum2 into buf2[SIZE−2] and buf2[SIZE−1] respectively.

Finally, the transactor 810 disables the clock of the RTL module 820. In this example code, the transactor 810 disables the clock of the RTL module by setting the value of clk_gate to 0, thus masking the switching of clock clk.

Figure 9:
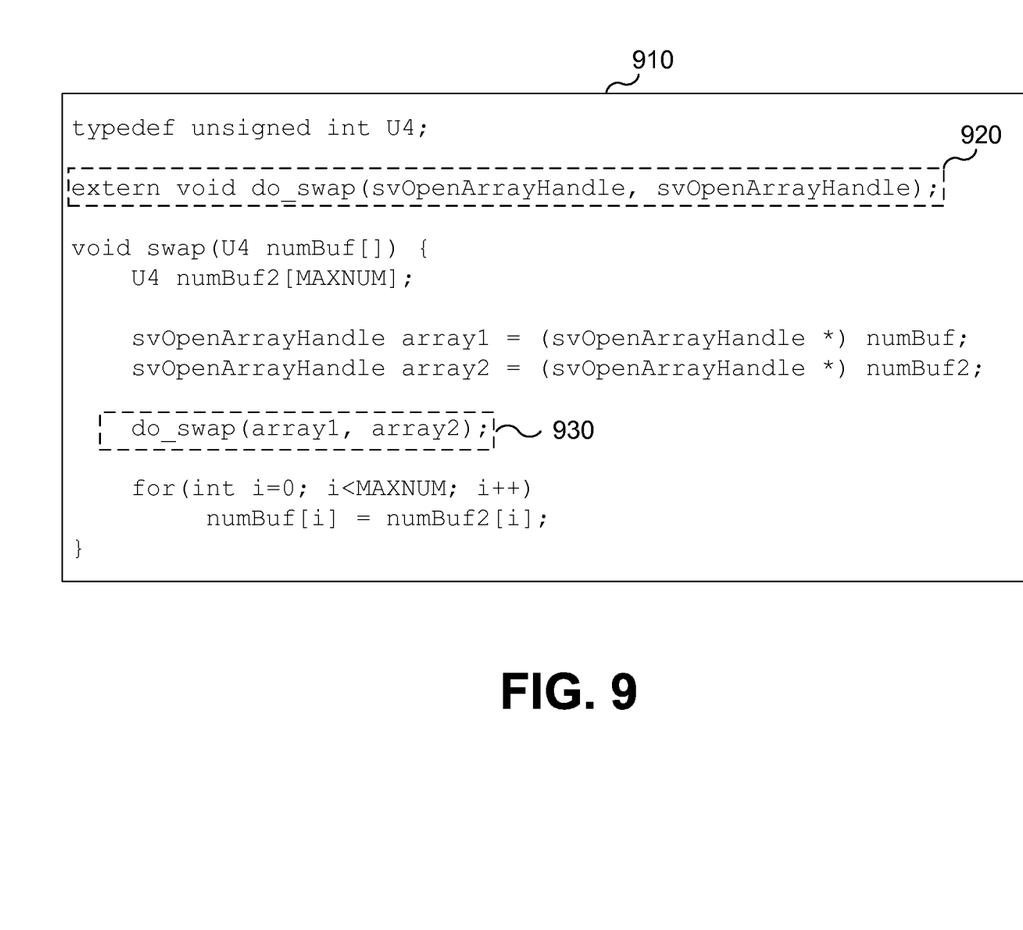
FIG. 9 is an exemplary code for a C module calling a transactor.

Embodiments may use a System-Verilog Direct Programming Interface (DPI) to enable interactions between a C module and a transactor. FIG. 9 illustrates a C module 910 calling transactor 810. At code 920, C module 910 indicates the system that function "do_swap" is an RTL module. At code 930, C module 910 calls function "do_swap." As illustrated in FIG. 8, "do_swap" is part of transactor 810 and handles the communication between a C module and RTL module 820.

In some embodiments, the testing of the C design is performed using a testbench. The testbench provides data to the design and collects the output of the design after the computation is performed. The testbench may be configured to run multiple test cases with different input values and determine whether the correct output is obtained. For instance, a testbench for a 32-bit adder may input two 32-bit numbers and collect the 32-bit sum and 1-bit carry outputs from the adder. For example, the testbench may input the values 0x2746A9C7 and 0x43D7F54B to the 32-bit adder, and collect the value 0x6B1E9F12 and a carry of 1 from the output of the 32-bit adder. The test bench may then determine that the computation of the adder was correct since the value collected at the output of the adder was as expected. In some embodiments, the testbench may be designed to test for a sub-set of all possible input combinations. In other embodiments, the testbench may be designed to test for all possible combination of input values.

During the verification of the mixed design, the same testbench used to simulate the C design may be used. Since the transactors handle all the data translations between C modules and RTL modules, the testbench may run tests on a mixed design as if the design only contained C modules.

Additional Configuration Considerations

The use of transactors to incrementally verify the implementation of a computer chip design beneficially reduces the time and complexity in finding errors or bugs introduced to the implementation of computer chip design. Furthermore, the use of transactors reduces the amount of time to migrate the design of the computer chip from an interpretive programming language, such as C language, to a design implemented in Register Transfer Level (RTL) using a hardware description language (HDL), such as Verilog.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for incrementally verifying the implementation of a computer chip design through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for incrementally verifying a circuit design, the method comprising:
  (a) representing a first subset of modules in the circuit design by one or more interpretive computer programming modules, wherein the circuit design is used to manufacture integrated circuits;
  (b) representing a second subset of modules in the circuit design by one or more hardware descriptive language (HDL) modules;
  (c) performing simulation of a mixed design which represents the first subset of the circuit design by the one or more interpretive computer programming modules and represents the second subset of the circuit design by the one or more HDL modules;

(d) translating a part of the first subset of modules into a HDL module to include the part of the first subset in the second subset of modules and remove the part from the first subset of modules, responsive to the simulation of the mixed design being successful; and (e) repeating (a) through (d) at least once until no module for translation remain in the first subset of modules.

2. The method of claim 1, wherein the interpretive programing language module is a C module and the hardware description language (HDL) module is a register transfer level (RTL) module.

3. The method of claim 1, further comprising:
responsive to receiving a request from one of the one or more interpretive computer programming language modules of the circuit design, calling one of the one or more HDL modules.

4. The method of claim 3, wherein performing the simulation comprises:
enabling the called HDL module;
pipelining input arguments from the an interpretive computer programming language module into the called HDL module;
receiving pipelined output data from the called HDL module;
formatting the receiving pipelined output data; and
returning the formatted data to the interpretive computer programming language module.

5. The method of claim 4 wherein enabling the called HDL module comprises: enabling a clock signal of the called HDL module.

6. The method of claim 4, wherein pipelining the input arguments comprises:
inputting a first subset of input arguments into the called HDL module during a first clock cycle; and
inputting a second subset of input arguments into the called HDL module during a second clock cycle.

7. The method of claim 4 wherein receiving pipelined output data comprises:
receiving a first set of output data from the called HDL module during a first clock cycle; and
receiving a second set of output data from the called HDL module during a second clock cycle.

8. The method of claim 7 wherein formatting the receiving pipelined output data comprises:
storing the first set of output data and the second set of output data into one or more arrays.

9. The method of claim 4, wherein performing the simulation further comprises disabling the called HDL module, wherein disabling the HDL module comprises disabling a clock signal of the called HDL module.

10. A computer readable medium configured to store instructions for incrementally verifying a circuit design, instructions when executed by a processor cause the processor to:
(a) represent a first subset of modules in the circuit design by one or more interpretive computer programming modules, wherein the circuit design is used to manufacture integrated circuits;
(b) represent a second subset of modules in the circuit design by one or more hardware descriptive language (HDL) modules;
(c) perform simulation of a mixed design which represents the first subset of the circuit design by the one or more interpretive computer programming modules and represents the second subset of the circuit design by the one or more HDL modules;
(d) translate a part of the first subset of modules into a HDL module to include the part of the first subset in the second subset of modules and remove the part from the first subset of modules, responsive to the simulation of the mixed design being successful; and
(e) repeat (a) through (d) at least once until no module for translation remain in the first subset of modules.

11. The computer readable medium of claim 10, wherein the interpretive programing language module is a C module and the hardware description language is a register transfer level (RTL) module.

12. The computer readable storage medium of claim 10, further comprising instructions to:
call one of the one or more HDL modules responsive to receiving a request from one of the one or more interpretive computer programming language modules of the circuit design.

13. The computer readable storage medium of claim 12, wherein instructions to perform the simulation comprise instructions to:
enable the called HDL module;
pipeline input arguments from the an interpretive computer programming language module into the called HDL module;
receive pipelined output data from the called HDL module;
format the receiving pipelined output data; and
return the formatted data to the interpretive computer programming language module.

14. The computer readable medium of claim 13 wherein the instructions for enabling the called HDL module causes the processor to: enable a clock signal of the called HDL module.

15. The computer readable medium of claim 13, wherein the instructions for pipelining the input arguments cause the processor to:
input a first subset of input arguments into the called HDL module during a first clock cycle; and
input a second subset of input arguments into the called HDL module during a second clock cycle.

16. The computer readable medium of claim 13 wherein the instructions for receiving pipelined output data cause the processor to:
receive a first set of output data from the called HDL module during a first clock cycle; and
receive a second set of output data from the called HDL module during a second clock cycle.

17. The computer readable medium of claim 13 wherein the instructions for formatting the receiving pipelined output data cause the processor to:
store the first set of output data and the second set of output data into one or more arrays.

18. The computer readable medium of claim 13, wherein instructions to perform the simulation further comprises instructions that cause the processor to disable the called HDL module.

19. The computer readable medium of claim 18 wherein the instructions for disabling the called HDL module cause the processor to disable a clock signal of the called HDL module.

\* \* \* \* \*